United States Patent
Shinoda et al.

(10) Patent No.: US 8,516,506 B2
(45) Date of Patent: Aug. 20, 2013

(54) METHOD AND SYSTEM FOR RESTORING AN APPLICATION IN A DYNAMICALLY LINKED ENVIRONMENT

(75) Inventors: Koji Shinoda, Farmington Hills, MI (US); Wan-ping Yang, Farmington Hills, MI (US); Hiroaki Shibata, Novi, MI (US)

(73) Assignees: DENSO International America, Inc., Southfield, MI (US); Denso Corporation, Kariya-shi (JP)

( * ) Notice: Subject to any disclaimer, the term of this patent is extended or adjusted under 35 U.S.C. 154(b) by 219 days.

(21) Appl. No.: 13/102,348

(22) Filed: May 6, 2011

(65) Prior Publication Data

US 2012/0254901 A1 Oct. 4, 2012

Related U.S. Application Data

(60) Provisional application No. 61/469,040, filed on Mar. 29, 2011.

(51) Int. Cl.
*G06F 9/44* (2006.01)
*G06F 17/30* (2006.01)
*G06F 7/00* (2006.01)
*G06F 11/00* (2006.01)

(52) U.S. Cl.
USPC .......... 719/328; 707/640; 707/821; 714/4.11; 714/47.1

(58) Field of Classification Search
USPC ........ 707/640, 821; 714/4.11, 47.1; 719/328
See application file for complete search history.

(56) References Cited

U.S. PATENT DOCUMENTS

| | | | | |
|---|---|---|---|---|
| 5,513,314 A * | 4/1996 | Kandasamy et al. | ........ | 714/6.31 |
| 6,314,532 B1 * | 11/2001 | Daudelin et al. | ........... | 714/38.14 |
| 6,496,944 B1 * | 12/2002 | Hsiao et al. | ..................... | 714/15 |
| 6,513,051 B1 * | 1/2003 | Bolosky et al. | ........................ | 1/1 |
| 7,865,472 B1 * | 1/2011 | Orcutt | ........................... | 707/640 |
| 2005/0192974 A1 * | 9/2005 | DeLorme et al. | ............. | 707/100 |
| 2006/0004890 A1 * | 1/2006 | Semple et al. | ................. | 707/204 |
| 2006/0143492 A1 * | 6/2006 | LeDuc et al. | ..................... | 714/2 |
| 2007/0168704 A1 * | 7/2007 | Connolly et al. | ................. | 714/6 |
| 2010/0262585 A1 * | 10/2010 | Rosikiewicz et al. | ......... | 707/679 |

* cited by examiner

*Primary Examiner* — Charles E Anya
(74) *Attorney, Agent, or Firm* — Harness, Dickey & Pierce, P.L.C.

(57) ABSTRACT

A method and system for executing an application on a device is disclosed. The device comprises a nonvolatile memory having a file system that stores the application. The nonvolatile memory further includes a backup memory space that stores a backup copy of the application. The system further includes a processing module configured to execute the application and an application programmers interface (API) utilized by the processing module to facilitate instructions from the application to the processing module. The processing module is further configured to retrieve the application from the file system, execute the application on the processing module; monitor interactions between the application and the processing module for an API call from the application to the processing module, and retrieve a backup copy of the application from the backup memory space based on the monitoring for the API call.

12 Claims, 4 Drawing Sheets

METHOD AND SYSTEM FOR RESTORING AN APPLICATION IN A DYNAMICALLY LINKED ENVIRONMENT

CROSS-REFERENCE TO RELATED APPLICATIONS

This application claims the benefit of U.S. Provisional Application No. 61/469,040, filed Mar. 29, 2011, the disclosure of which is incorporated herein by reference.

FIELD

The present disclosure relates to a method and system for restoring an application in a dynamically linked environment.

BACKGROUND

This section provides background information related to the present disclosure which is not necessarily prior art.

Many devices today utilize a processor or microprocessor that executes core software. Further, the architectures of these processors or microprocessors may be open to programmers to develop applications for the device. For instance, third party developers or in-house developers may design applications for the telematics device. In order to facilitate the widespread designing of applications to execute on the processor, the processor manufacturer can develop an application programmers interface (API) for the developers to interface between the application and the processor. An API is a set of rules and specifications that a developer uses to access and make use of the services and resources of the operating system executing on the processor. Thus, an API can serve as an interface between a first software application and a second software application. For example, an API allows a programmer to develop an application that may execute on an operating system of a telematics device. The developer of the application need not know the particular system calls for the particular processor used in the telematics device or the operating system executing thereon. Rather, an API having standardized rules and specifications independent of the processor or operating system allows the programmer to use the syntax and rules of the API, such that the API provides a layer of abstraction from the lower level software and/or hardware components of the device.

Traditionally, the applications intended for a device were statically linked with the link libraries and files of the API. That is, the applications were linked at compile time. As API designers now increasingly desire to expand and modify the link libraries, operating systems of devices are starting in dynamically link the applications to the linked libraries of the API. For example, the Binary Runtime Environment for Wireless (BREW) is an API developed by Qualcomm that allows developers to develop applications for mobile devices. Historically, BREW was statically linked, but the most recent BREW APIs require dynamic linking of BREW applications. In order to run a dynamically linked BREW application, there are a number of complicated processes that are executed prior to executing the BREW application. The execution of these complicated processes increases a risk that the BREW application will not execute. Thus, an issue that arises is a dynamically linked environment is that the dynamic linking of applications increases the risk that the application will not to start, as opposed to such a likelihood in a statically linked environment. Thus, there is a need to increase the reliability of dynamically linked applications.

Further areas of applicability will become apparent from the description provided herein. The description and specific examples in this summary are intended for purposes of illustration only and are not intended to limit the scope of the present disclosure.

SUMMARY

This section provides a general summary of the disclosure, and is not a comprehensive disclosure of its full scope or all of its features.

In an aspect of a disclosure, a method for executing an application is disclosed. The application is stored in a file system, executed on a processor of a device, and utilizing an application programmers interface (API) to facilitate instructions from the application to the processor. The method comprises retrieving the application from the file system, executing the application on the processor, monitoring interactions between the application and the processor for an API call, retrieving a backup copy of the application from a backup memory space based on the monitoring for the API call, and storing the backup copy of the application is stored in the file system.

In another aspect of the disclosure, a system for executing an application on a device is disclosed. The device comprises a nonvolatile memory having a file system that stores a plurality of applications, including the application. The file system further having a backup memory space that stores a plurality of backup copies of the applications, including a backup copy of the application. The system further includes a processing module configured to execute the application and an application programmers interface (API) utilized by the processing module to facilitate instructions from the application to the processing module. The processing module is further configured to retrieve the application from the file system, execute the application on the processing module; monitor interactions between the application and the processing module for an API call from the application to the processing module, retrieve a backup copy of the application from the backup memory space based on the monitoring for the API call, and store the backup copy of the application is stored in the file system.

DETAILED DESCRIPTION

Example embodiments will now be described more fully with reference to the accompanying drawings.

DRAWINGS

The drawings described herein are for illustrative purposes only of selected embodiments and not all possible implementations, and are not intended to limit the scope of the present disclosure.

A system and method are disclosed herein for a framework to recover an application that is to be executed on a device when a runtime error occurs. The application is stored in a file system and the processor of the device loads the application from the file system and launches the application on RAM. The processor monitors API calls made by the application to determine if the application is in an error state. When an API call is not realized, the processor will initiate a recovery action. For example, the application may be recovered from a backup location or the file system may be rebuilt.

Figure 1:
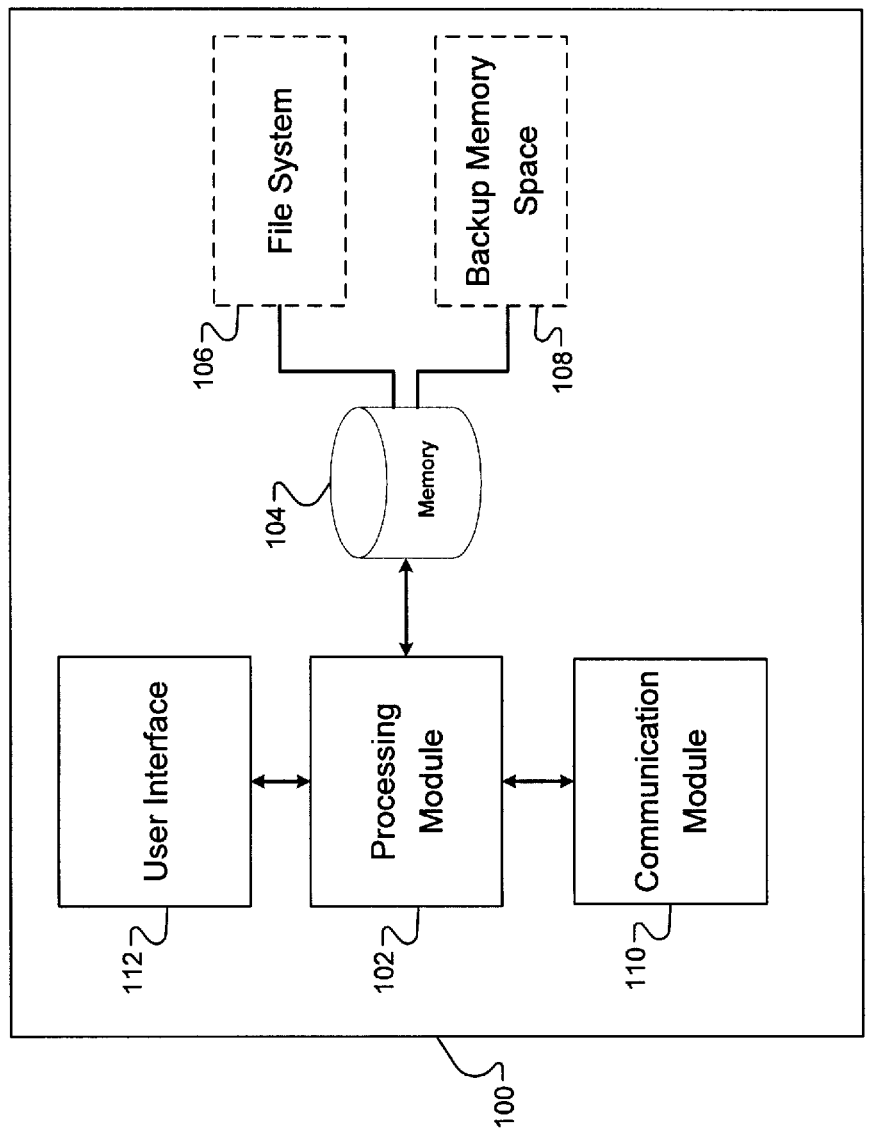
FIG. 1 is a block diagram that illustrates exemplary components of a device.

FIG. 1 illustrates an exemplary device 100. The device 100 may function as a telematics device, a cellular telephone, a tablet PC, a PDA or the like. The device 100 is comprised of a processing module 102, a non-volatile memory 104 in operable communication with processing module 102, and optionally a user interface 112 and a communication module 110.

The processing module 102 is configured to perform the core functionality of the device 100. The processing module 102 may be comprised of a processor, a microprocessor, a microcontroller or any other processing unit. The processing module 102 may be further comprised of random access memory (RAM) or other volatile memory. The processing module 102 is configured to execute the operating system of the device 100. Further, the processing module 102 is configured to read and/or write data from the non-volatile memory 104. The processing module 102 stores or retrieves applications from the memory 104 and write the applications to the RAM of the processing module 102.

The non-volatile memory 104 may be any suitable memory device. For instance, the non-volatile memory device 104 may be a hard disk drive or a flash memory device. The memory device 104 is partitioned into at least two sections including a file system 106 and a backup memory space 108. The file system 106 organizes the data used by the processing module 102 into a plurality of directories and/or files. Amongst the plurality of files, the file system 106 stores applications that are developed for the device 100. It is appreciated that the applications can vary in subject matter. For example, in a telematics device, applications may include a CDMA application, a GPS application, or an internet radio application. The applications may be developed by the device manufacturer or a third party developer. The applications are comprised of computer executable instructions. In some embodiments the applications are compiled and stored in the file system, but are not linked until load time or run time.

The backup memory space 108 stores backup copies of data. For instance, the backup memory space stores backup copies of the applications. Thus, when an application stored in the file system 106 is corrupted the file system 106 can retrieve the backup copy of the application from the backup memory space 108 and restore the application on the file system 106.

The device 100 may further include a user interface 112 and/or a communication module 110. The user interface 112 is configured to receive input data from a user and to output data to the user. For instance, in a telematics device, the user interface 112 may allow a user to enter commands via a touch screen and may display screens to the user indicating a state of the telematics device.

The communication module 110 is configured to send and/or receive data from an external data source. For example, if the device is a telematics device or a mobile telephone, the communication module 110 may be configured to communicate with a cell phone tower or GPS satellites. In the example of a telematics device, if the device 100 is executing a CDMA telephone application, the communication module 110 can be configured to communicate with a communication node, such as a cell phone tower. The communication module 110 will transmit data to and receive data from the communication node.

It is appreciated that the device 100 can include additional components. The foregoing configuration is exemplary and is provided for example only.

Figure 2:
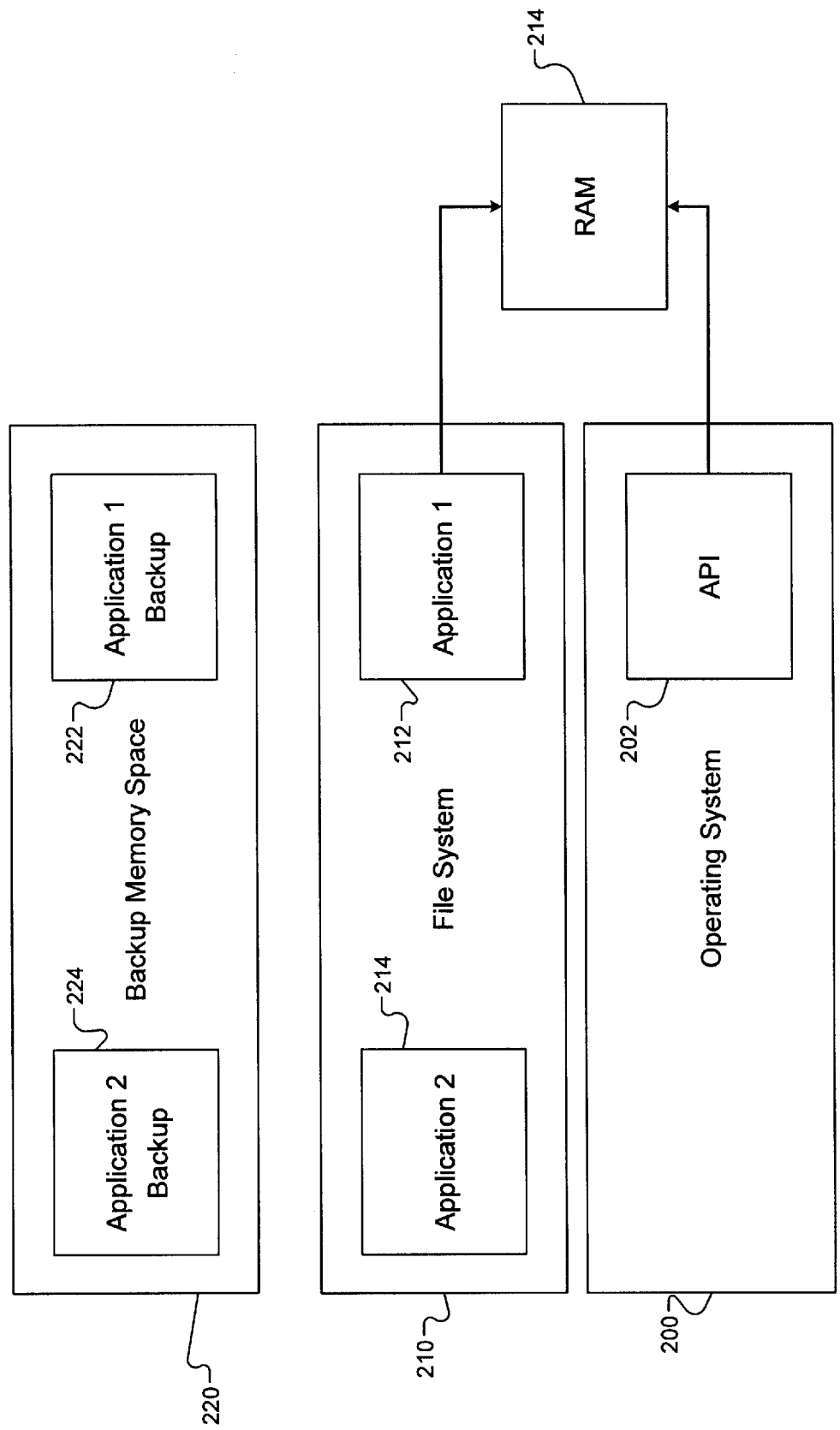
FIG. 2 is a drawing of an exemplary hierarchy of a device.

FIG. 2 illustrates an exemplary hierarchy of the run time environment of the device 100. At a first level 200, the operating system executes tasks relating to the core functionality of the device 100. The operating system includes an application programmer interface (API) 202 that allows the applications to interface with the operating system level 200. The API 202 defines a set of rules and instructions that a developer can use without knowing the preferred system calls or functionality of the operating system. Further, the API 202 includes a set of libraries that define functions and subroutines to support the applications. At run time, the operating system dynamically links the libraries with the executable code of the application.

When a developer is developing an application, the developer can utilize instructions defined by the API 202 without having to program the application specifically for the device 100. Thus, the API allows the application to execute across a variety of platforms. In some embodiments, the API is Binary Runtime Environment for Wireless (BREW), developed by Qualcomm.

At a second level 210, the file system 106 sits on top of the operating system level 200. The file system 106 stores a plurality of applications including a first application 212 and a second application 214. It is appreciated that when the first application 212 is called for execution, the application 212 and the link libraries of the API 202 will be compiled and linked by the operating system and stored on the RAM 214.

Above the second layer 210, the backup memory space 108 resides in a third layer 220. The backup memory space 108 stores backup copies of the plurality of applications including a first application backup 222 and a second application backup 224. The backup memory space resides on top of the second layer 210, such that if the file system 106 fails, the file system 106 will access the backup memory space to retrieve copies of the first and second applications and store them back in the filing system 106. Furthermore, the filing system 106 may be configured to be re-partitioned and reconfigured if the file system itself has failed.

It is appreciated that the foregoing hierarchy is merely exemplary in nature and it is envisioned that other hierarchy may be implemented in the device 100.

Figure 3:
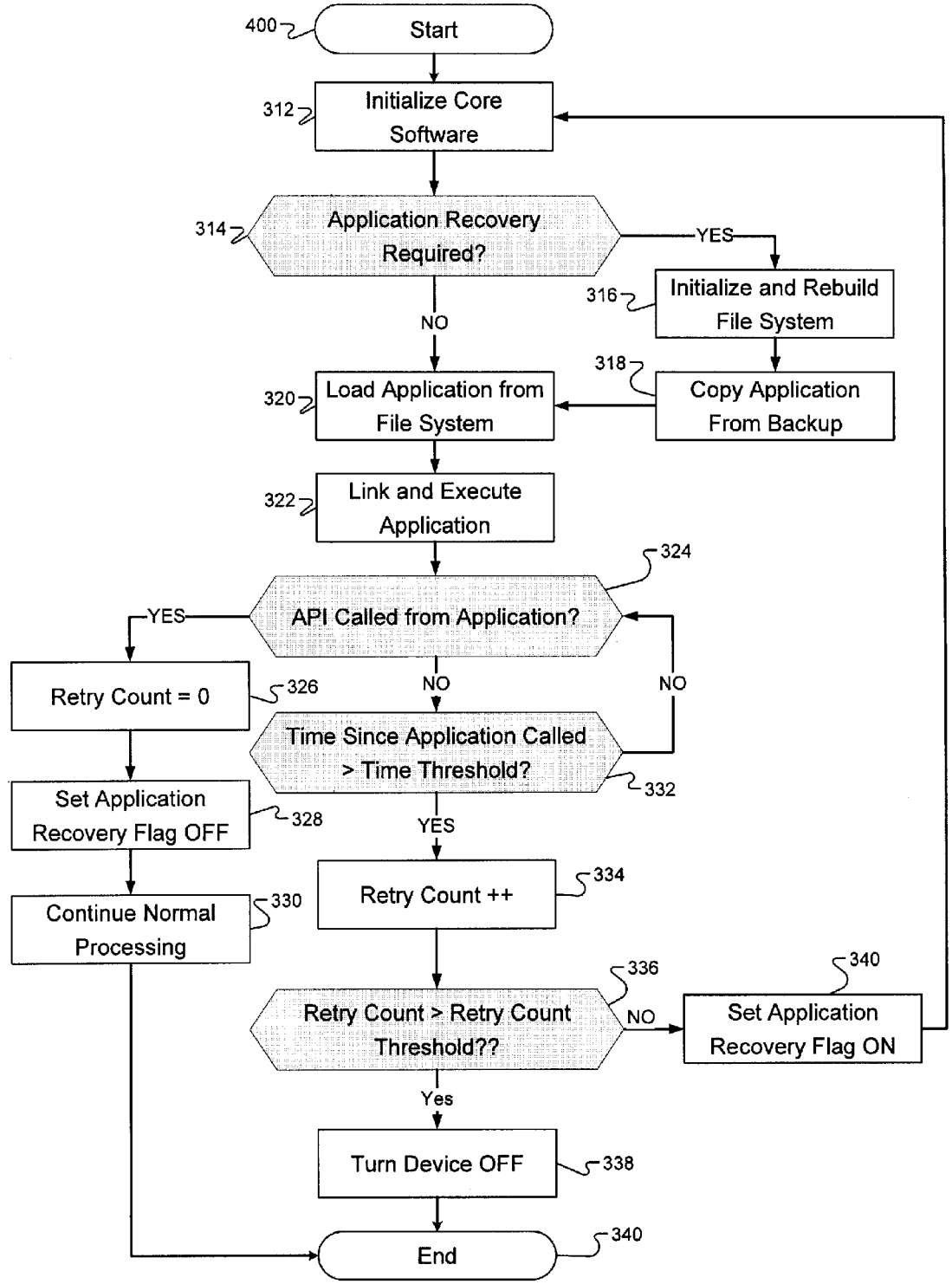
FIG. 3 is a flow chart illustrating an exemplary method that may be executed at runtime of a dynamically linked application.

FIG. 3 illustrates an exemplary method that can be executed by the processing module 102. The method shown in FIG. 3 can be executed each time an instance of an application is requested by a user or a task of the operating system. The method may also be executed upon powering up the device 100. For instance, if a user wishes to initiate a telephone call using a CDMA application executable by a telematics device, the method illustrated in FIG. 3 may executed.

Upon powering up the device 100, the processing module 102 initializes the core software of the device 100. In some embodiments the core software is the operating system of the device 100. Once the core software has been initialized, the device 100 may receive an instruction to initiate an application. Prior to loading the application from the file system 106, the processing module 102 will determine if an application recovery is required, as shown at step 314. As will be discussed below, a flag or a similar indicia may be maintained which indicates whether an application recovery is needed. Thus, the processing module 102 will check the value of an application recovery flag to determine if an application recovery is required. If an application recovery is required, the processing module 102 will initialize and rebuild the file system 106, as shown at step 316. It is appreciated that any suitable means for initializing and rebuilding the file system may be utilized. Generally, a processor or microprocessor is preprogrammed with a predetermined set of instructions for performing the file system rebuild process upon receiving a rebuild instruction.

Once the file system 106 is rebuilt, the backup memory space 108 will receive an instruction from the file system 106 to obtain a backup copy of the application from the backup memory space 108. The file system 106 will receive and copy the backup copy of the application to the file system 106, as shown at step 318. It is appreciated that the file system can request a plurality of backup copies of applications. For example, if the device includes a GPS application and a CDMA application, the file system 106 will request the backup GPS application and the backup CDMA application. The file system 106 receives and subsequently stores the backup copies of the applications in the file system.

If the application does not need recovery, or after rebuild and recovery operations have been performed, the processing module 102 will load the application from the file system to RAM, as shown at step 320. To do so, the processing module 102 requests the application from the file system 106. The file system 106 returns the executable code of the application to the processing module 102. Once processing module 102 has received the application, the application can be stored on the RAM of the processing module 102.

The processing module 102 will then link the application to any link files or link library files contained in the API as shown at step 322. In some embodiments, the processing module 102 will link the executable code of the application and the executable code of the link libraries or link files contained in the API at load time. In other embodiments, the processing module 102 will link the executable code of the application and the executable code of the link libraries or link files contained in the API at run time. Once the application program has been linked to the link files or link libraries, the processing module 102 can begin executing the application.

Once the application has begun executing, the processing module 102 can determine whether an API call from the application was issued by the application, as shown at step 324. It is appreciated that while executing, the application will necessarily make API calls. If the application is an error state, e.g., the application program did not successfully link to the link files, then the application will not make API calls. If an API call is received by the operating system, the processing module 102 will infer that the application is executing properly. If the application is operating properly, the processing module 102 will set a retry count to 0, as shown at step 326. The retry count is described further below. The processing module 102 will also set the application recovery flag equal to OFF, as shown at step 328, and will continue executing the application, as shown at step 330.

If an API call is not received by the processing module 102, then the processing module 102 will determine an amount of time that has lapsed since the application began executing. The amount of time is compared with a time threshold, as shown at step 332. The time threshold indicates a maximum amount of time that may lapse before an API call should be issued by the application. Thus, the processing module 102 will continue to check if an API call is received until either the API call is received or the time threshold is exceeded, as shown by the loop formed between steps 332 and 324. When the time threshold is exceeded, the processing module 102 can consider the application to be in an error state, e.g., the application has not linked properly to the link files or libraries of the API.

Once the time threshold is exceeded, the processing module 102 will increment the retry count, as shown at step 334. The retry count indicates an amount of continuous times that that an application has been determined to be in an error state. The retry count is compared to a retry threshold, as shown at step 336. If the retry count exceeds the retry threshold then a corrective action is taken. For example, the device can be turned off, as shown at step 338.

If the retry count is below the retry threshold, the application recovery flag is set to ON, as shown at step 340. The processing module can then reinitialize the core software, at step 312, such that when the processing module 102 checks the application recovery flag, the processing module 102 will eventually retrieve a backup copy of the application. Alternatively, the processing module 102 may skip the initializing core software step.

It is appreciated that variations of the method may be implemented and are within the scope of this disclosure. Further, it is noted that some of the steps shown with respect to FIG. 4 may be combined into a single step, while other steps may be performed in multiple steps.

Figure 4:
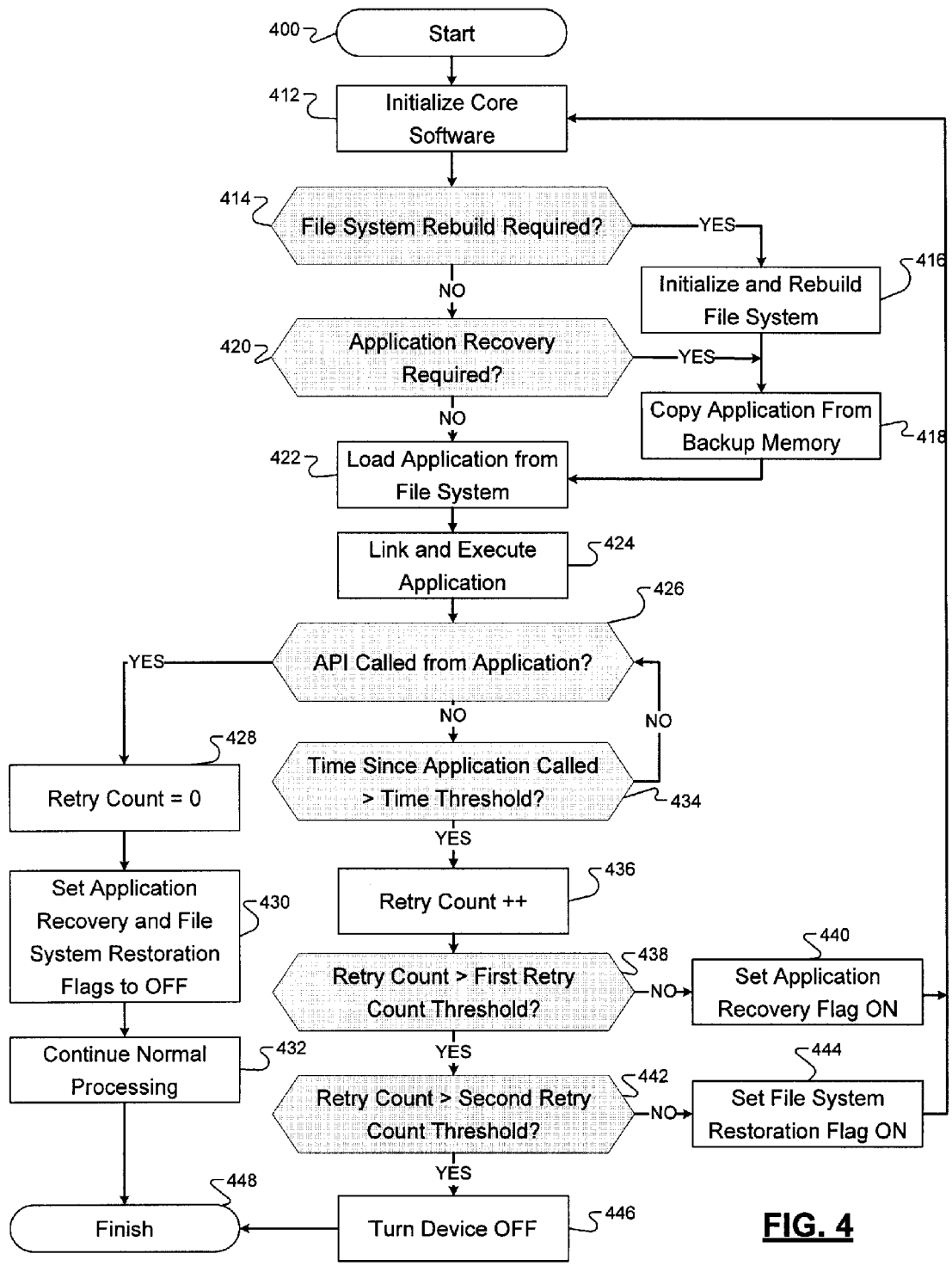
FIG. 4 is a flow chart illustrating an exemplary method that may be executed at runtime of a dynamically linked application.

FIG. 4 illustrates an alternative embodiment of the method that was discussed with respect to FIG. 3. As discussed with respect to FIG. 3, upon powering on the core software will be initialized by the processing module 102, as shown at step 412. Upon initializing the core software, the processing module 102 will determine whether a file system restoration operation is to be performed, as shown at step 414. In some embodiments, the processing module 102 will check the value of a file restoration flag. If a file system restoration is required, then the processing module 102 will initialize and rebuild the file system, as shown at step 416. The processing module 102 will then retrieve backup copies of one or more applications from the backup memory space, and copy the backup applications onto the file system 106, as shown at step 418.

If a file system rebuild operation is not required, the processing module 102 will determine if an application recovery operation needs to be performed, as shown at step 420. For example, in some embodiments, the processing module 102 will maintain an application recovery flag that indicates whether an application recovery operation needs to be performed. In these embodiments the operating system can check the application recovery flag to determine whether the application recovery is requested. If the application recovery flag is set to ON, then the application is copied from the backup memory space 108 to the file system 106, as shown at step 418.

After the application recovery flag and the file system restoration flag have been checked, the processing module 102 will load the application from the file system 106 to the RAM, as shown at step 422. The processing module 102 will then link files from the API to the application and will begin executing the application, as shown at step 424. In some embodiments, the processing module 102 will link the executable code of the application and the executable code of the link libraries or link files contained in the API at load time. In other embodiments, the processing module 102 will link the executable code of the application and the executable code of the link libraries or link files contained in the API at run time. Once the application program has been linked to the linked, the processing module 102 can begin executing the application.

Once the application has started executing, the operating system will check whether an API call has been made from the operating system, as shown at step 426. If a call has been made from the API, then the retry count is set to zero, the application recovery and file system restoration flags are set to OFF, and the processing module 102 continues executing normally, as shown at steps 428 through 432.

If, however, an API call is not received, then the processing module 102 will compare the amount of time that has lapsed since the application began executing against a time threshold, as shown at step 334. Once the amount of time since the application was called and without an API call being received exceeds the time threshold, the retry count is incremented, as shown at step 436. As described above, the retry count indicates how many times the application has been determined to be in an error state.

In the current embodiment, the processing module 102 will first attempt to recover the application without rebuilding the file system 106. If after a predetermined amount of application recovery attempts, the processing module 102 will rebuild the file system 106 and attempt to recover the application. If the error is not resolved after a predetermined amount of file system restoration attempts, a corrective action is taken, e.g., the device is turned off.

Thus, the processing module 102 will compare the retry count against a first retry count threshold, e.g., 4, as shown at step 438. If the retry count does not exceed the first retry count threshold, then the application recovery flag is set to ON, as shown at step 440, and the method returns to step 412. If the retry count does exceed the first retry count threshold, then the retry count is compared against a second retry count threshold, e.g., 2, as shown at step 442. If the retry count does not exceed the second retry count threshold, then the file system recovery flag is set to ON, as shown at step 444. The method will then return to step 412. If the retry count does exceed the second retry count threshold, then the processing module 102 turns a corrective action, e.g., turning the device off, as shown at step 442.

It is appreciated that variations of the method may be implemented and are within the scope of this disclosure. Further, it is noted that some of the steps shown with respect to FIG. 4 may be combined into a single step, while other steps may be performed in multiple steps.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method for executing an application stored in a file system, executed on a processor of a device, and utilizing an application programmers interface (API) to facilitate instructions from the application to the processor, the method comprising:
   initializing core software;
   retrieving the application from the file system;
   executing the application on the processor;
   monitoring interactions between the application and the processor for an API call;
   determining an amount of time lapsed without observing an API call and comparing the amount of time against a time threshold;
   maintaining a count indicating a number of times that the interactions between the processor and the application indicate that the application is in an error state, wherein an error state occurs when a predetermined amount of time lapses without the API call being observed;
   setting an application recovery flag when the count exceeds a predetermined threshold;
   retrieving a backup copy of the application from a backup memory space based on the monitoring for the API call;
   rebuilding the file system when the application flag is set, wherein the backup copy of the application is retrieved after the file system is rebuilt; and
   storing the backup copy of the application in the file system.

2. The method of claim 1 further comprising turning the device off when the count exceeds a second threshold, wherein the backup copy of the application is not retrieved when the count exceeds the second threshold.

3. The method of claim 1 further comprising linking the application to the API during one of the retrieving of the application or the executing of the application.

4. The method of claim 1 further comprising dynamically linking the application to the API.

5. The method of claim 1 wherein the retrieving step is not performed when an API call is observed within a predetermined time period.

6. The method of claim 1 wherein the device is one of a telematics device and a mobile telephone.

7. A system for executing an application on a device, the application being embodied as computer executable instructions, the method comprising:
   a nonvolatile memory including a file system that stores a plurality of applications, including the application and further including a backup memory space that stores a plurality of backup copies of the plurality of applications, including a backup copy of the application;
   a processing module configured to execute the application;
   an application programmers interface (API) utilized by the processing module to facilitate instructions from the application to the processing module, the processing module further configured to:
  initialize core software;
  retrieve the application from the file system;
  execute the application on the processing module;
  monitor interactions between the application and the processing module for an API call;
  determine the amount of time lapsed without observing an API call and compare the amount of time against a time threshold;
  maintain a count indicating a number of times that the interactions between the processing module and the application indicate that the application is in an error state, wherein an error state occurs when a predetermined amount of time lapses without the processing module observing an API call;
  set an application recovery flag when the count exceeds a predetermined threshold;
  retrieve the backup copy of the application from the backup memory space based on the monitoring for the API call;
  rebuild the file system when the application flag is set, wherein the backup copy of the application is retrieved from the backup memory space after the file system is rebuilt; and
  store the backup copy of the application in the file system.

8. The system of claim 7 wherein the processing module is further configured to turn the device off when the count exceeds a second threshold, wherein the backup copy of the application is not retrieved when the count exceeds the second threshold.

9. The system of claim 7 wherein the processing module is further configured to link the application to the API upon retrieving the application or at the commencement of the execution of the application.

10. The system of claim 7 wherein the processing module dynamically links the application to the API.

11. The system of claim 7 wherein the processing module does not retrieve the backup copy of the application when an API call is observed within a predetermined time period.

12. The system of claim 7 wherein the device is one of a telematics device and a mobile telephone.

* * * * *